United States Patent [19]
Dornan

[11] Patent Number: 5,296,173
[45] Date of Patent: Mar. 22, 1994

[54] TIRE SECTION REPAIR UNIT AND METHOD

[75] Inventor: R. James Dornan, Scarborough, Canada

[73] Assignee: Vulcan Vulcap Industries, Inc., Ontario, Canada

[21] Appl. No.: 952,607

[22] Filed: Sep. 28, 1992

Related U.S. Application Data

[63] Continuation of Ser. No. 802,353, Dec. 4, 1991, abandoned.

[51] Int. Cl.$^5$ .................... B60C 25/16; B29C 35/04
[52] U.S. Cl. ................................ 264/36; 264/40.6; 264/315; 264/40.5; 425/14; 425/27; 425/143; 425/188; 425/442
[58] Field of Search ............... 425/14, 27, 12, 16, 425/26, 188, 143, 162, 442; 156/94, 95, 96; 264/36, 315, 326, 40.6, 40.5

[56] References Cited

U.S. PATENT DOCUMENTS

| | | |
|---|---|---|
| 1,391,374 | 9/1921 | Dunken et al. . |
| 2,421,102 | 5/1947 | Lakso et al. . |
| 2,439,083 | 4/1948 | French . |
| 3,031,719 | 5/1962 | Alm .................... 425/14 |
| 3,327,351 | 6/1967 | Alm .................... 425/27 |
| 3,919,021 | 11/1975 | Whittle . |
| 3,924,981 | 12/1975 | Sarumaru . |
| 3,940,463 | 2/1976 | Nicholson ............. 264/36 |
| 3,969,179 | 7/1976 | Foegelle . |
| 4,284,451 | 8/1981 | Conley ................. 425/14 |
| 4,303,380 | 12/1981 | Frankforter .......... 264/36 |
| 4,375,231 | 3/1983 | Bubik et al. . |
| 4,708,608 | 11/1987 | DiRocco ............... 425/14 |
| 4,720,313 | 1/1988 | Wegehaupt ........... 264/36 |
| 4,923,543 | 5/1990 | Koch et al. . |
| 4,978,403 | 12/1990 | Kinyon . |

FOREIGN PATENT DOCUMENTS 1250696 12/1960 France .................. 264/36

Primary Examiner—Jeffery Thurlow
Assistant Examiner—Mathieu Vargot
Attorney, Agent, or Firm—Niro, Scavone, Haller & Niro

[57] ABSTRACT

An improved tire section repair unit for the repair of a damaged section of a tire. The repair unit includes two curved side walls pivotally connected to the base of the unit. A locking arm is provided that securely encloses the entire system of curved walls, base and internal air bag and heat pad arrangement situated about the tire under repair. The pivotable side wall design permits the repair of tires of varying sizes. A locking arm arrangement permits the use of lightweight side walls to enclose the system. As a result, the repair unit of the present invention is more transportable and less cumbersome to use.

16 Claims, 2 Drawing Sheets

TIRE SECTION REPAIR UNIT AND METHOD

This application is a continuation of U.S. Ser. No. 07/802,353, filed Dec. 4, 1991, now abandoned.

BACKGROUND OF THE INVENTION

The present invention relates generally to an apparatus useful for the repair of a damaged section of a tire. More specifically, the present invention relates to an apparatus used for vulcanizing a rubber patch that employs heat and pressure during the repair process.

Various types of apparatus have been used in the past to repair a damaged section of a tire. It is well known to use a molded section that conforms with the shape of the tire, in conjunction with an arrangement of heat pads and air bags on both the interior and exterior of the tire. The heat pads increase the temperature of a patch applied to the damaged area to the required vulcanization temperature. The air bags are employed to maintain pressure on the heat pads for the distribution of heat throughout the patch. An example of such an apparatus is described in detail in U.S. Pat. No. 4,708,608.

In another known apparatus, the molded section that conforms with the shape of the tire is replaced with a series of straps that maintain pressure on the heat pads which are in direct contact with the repair patch. The application of heat under pressure effectively vulcanizes the rubber patch in the repair area. In this apparatus, the straps surrounding the tire are connected to a chain which is connected to a crane or other holding means. The tire is suspended from the crane during the repair process. An example of such an apparatus is described in detail in U.S. Pat. No. 4,720,313.

However, prior art devices suffer from the problem of transportability of the entire apparatus. Prior art molded repair units are extremely large, heavy and expensive. One of the primary factors that prevents the prior art apparatus from being transportable is the requirement that a separate control station be used in conjunction with the repair unit. Such a control station is needed to operate the repair unit, and includes the control of electrical power, air inflation of mandrels, heat generation in the heat pads, and pressure in the system. Also, the molded shape of the apparatus limits the size of the tire that may be serviced. The sheer size of units containing external control stations makes their operation difficult and cumbersome.

Further, a serious problem persists with tire repair units that employ straps for the application of heat under pressure to the patch to be Vulcanized. Straps have proven ineffective in maintaining an evenly distributed and uniform pressure on the repair patch. Any deviation from a uniform pressure of heat will result in a malformed patch. As a result, the integrity of the patch will be seriously compromised.

No prior art apparatus has successfully provided a solution to these problems which arise during the repair of a damaged tire section. Thus, known devices fail to provide a lightweight and portable tire repair unit which enables the application of uniform pressure to assure proper vulcanization of rubber patches on a tire section to be repaired, and which can be used on a wide range of tire sizes.

SUMMARY OF THE INVENTION

The present invention preserves the advantages of prior art tire repair devices. It also provides new advantages not found in currently available tire section repair units, and overcomes many of the disadvantages found in prior art devices. The present invention is generally directed to a new and improved tire section repair unit that is lightweight, portable, and can apply uniform heat and pressure to properly vulcanize rubber patches onto a tire section requiring repair. The invention includes a base member, two substantially rigid and upwardly extending, curved side walls pivotally attached to the base member, and positioned at a predetermined distance from one another, and a locking arm joining the side walls.

An air bag and heat pad assembly is also provided on the interior as well as the exterior of the tire within said side walls to envelope the damaged portion of the tire. This assembly provides the necessary heat and pressure to properly vulcanize the repair patch in the damaged area.

The side walls are disposed so as to surround the section of the tire that is under repair. The walls may be curved to conform to the shape of a tire and are secured in place around the damaged area of the tire by the locking arm, which bridges the gap between the top portions of the two walls. Attachment of the locking arm completes the entire tire section repair unit. The assembled unit thus forms a substantially rigid and secure structure that completely encloses the damaged tire section under repair. When the air and heat bag assembly is inflated, the structure will provide the external support so that uniform pressure about the tire under repair may be achieved to ensure evenly distributed and distortion-free curing of the repair patch.

In the preferred embodiment, the locking arm is a positive lock bar clamp assembly. A number of lock rings are provided on the upper side of each of the walls. These lock rings engage with corresponding lock rings on the locking arm. To secure the locking arm to the two walls, a lock pin with a safety latch is inserted through the lock rings. The invention may further provide that turning of the lock pin will cause its threads to engage with the threads of the lock rings. Further turning causes the lock rings to spread apart and communicate in pressurized fashion against the corresponding lock rings of the locking arm. This "positive lock" action assists in maintaining the locking arm in place. As a result, the locking arm is secured in place enclosing the entire unit for subsequent inflation of the air and heat assembly, and later "distortion-free" curing of the repair patch.

An additional feature of the preferred embodiment is the inclusion of a control panel directly on one of the curved side walls of the unit for selectively maintaining the environment about damaged tire area and within the side walls. The control panel carries all controls, gauges and receptacles for operation of the repair unit. Controls include a power switch with indicator light, an inflate/exhaust air valve, and a regulator. Gauges are included for air bag pressure, mandrel pressure, and current measurement. Receptacles are included for features such as mandrel air, air supply, power in, the inner heat pad power and the outer heat pad power. The receptacle for mandrel air is used as an air input for feeding into the mandrel. The mandrel pressure gauge monitors the air pressure through that input. The receptacle may also be provided with electrical power for the repair unit. Also, receptacles for routing power to various heat pads may be employed. Overall, the control panel provides any receptacle or gauge required for safe and proper operation of the invention.

Accordingly, an object of the invention is to provide a tire section repair unit which is lightweight, compact and able to accommodate a wide size range of tires, including both radial and bias ply tire types, for repair by vulcanization of a patch.

An additional object of the invention is to provide a tire section repair unit that repairs a section of a damaged tire by a uniform and distortion-free cure of a patch.

A further object of the invention is to provide a tire section repair unit which employs lightweight sidewalls and a positive lock-bar clamp assembly to bridge the gap between the two side walls and maintain the entire unit in a rigid and secure structure during operation.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
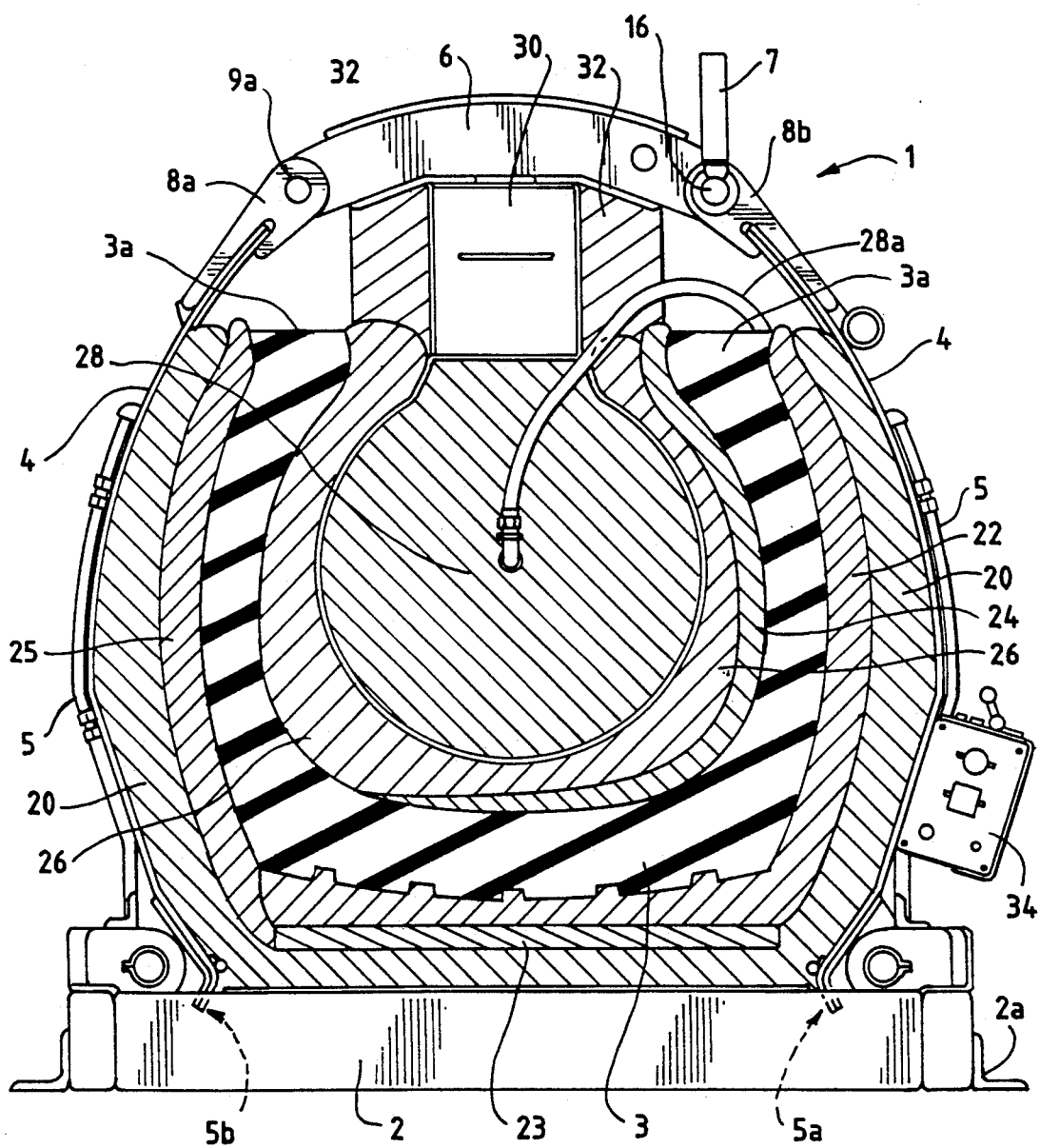
FIG. 1 is a partial cross-sectional view of the sectional tire repair unit of the present invention.

FIG. 1 shows the particularly preferred embodiment of the present invention, which incorporates a locking arm 6 for containment of the entire tire section repair unit 1. This preferred embodiment includes a base member 2 for support of the repair unit 1. Base member 2 is a heavy and sturdy block of metal that is designed to support a fairly large weight of a tire under repair, as well as the surrounding side wall arrangement containing air bags and heat pads.

The base member 2 is large and heavy enough to prevent the entire unit 1 from tipping over when tire 3 is actually within the repair unit 1 and is in operation. Additionally, base member 2 is provided with securing feet 2a provided with holes. Feet 2a may be used to secure the entire tire repair unit 1 to a surface below, such as concrete, through the use of fasteners such as screws or bolts.

Connected to the base member 2 are two curved side walls 4. Side walls 4 are connected to the base member 2 in pivotable fashion at point 5a. The pivoting nature of the connection between the side walls 4 and the base member 2 is essential to achieve the objective of making the unit 1 lightweight and enabling it to accommodate a wide range of tire sizes. Since the side walls 4 pivot at the base member 2, the side walls 4 may open up sufficiently wide to initially receive tire 3 and other internal parts during loading. Such a wide opening allows for easy preparation of the tire for repair. The ability of the side walls to open to receive tire 3 adds greatly to the flexibility of the repair unit. Since the side walls disclosed in the preferred embodiment may, for example, open up or pivot away from their closed vertical position as much as 35 degrees, the repair unit may accommodate tires of greatly varying sizes. Such an ability is a significant advance over prior art repair units. For example, a repair unit of this invention may accommodate earth mover tires ranging in size from 18.00×24/25/33 to 26.5×25/29/35/49. The overall diameter range for one unit for example, may be 63.8 inches to 71.54/75.54 inches. Further, the tread width range may be 18.45 inches to 23.85 inches. Repair units of other sizes may also be manufactured according to the invention which would accommodate proportionally similar tire size ranges.

Side walls 4 are of a shape to conform to the general dimensions of a section of tire 3 under repair. The conforming shape of side walls 4 is essential to the tire section repair unit's ability to provide a distortion free cure of the area of tire 3 under repair. Since the side walls surround the tire completely and generally conform to its shape, each point on side walls 4 will be approximately the same distance away from tire 3. As a result, pressure onto the surface of tire 3 during operation will be uniform at all points. This uniformity of pressure also facilitates the maintenance of a uniform temperature both within and outside the tire section to be repaired.

With regard to the uniform application of pressure on tire 3 to provide distortion-free repair, the internal structure surrounding tire 3 is critical to its repair. Still referring to FIG. 1, curing accessories must be packed around tire 3 before curing may begin. To facilitate loading, packing is conducted with side walls 4 opened to their maximum position. Inside heat pad 24 sits within tire 3 and directly contacts it in the area of damage that will be cured. An inside air bag 26 is also provided which is loaded within the tire 3 so as to completely cover its inner walls. Within inside air bag 26 sits inflatable mandrel 28, which provides the majority of inflation needed to maintain pressure on the inside of tire 3. Air supply hose 28a provides air to mandrel 28 from an outside air source. Adjustment of pressure within inside air bag 26 will effectively fine tune the total pressure exerted on the inside wall of tire 3.

Referring still to FIG. 1, the outside of tire 3 must also be equipped with air bag and heat pad accessories. Outside heat pad 22 directly abuts tire 3 in the region to be cured. Heat pad 22 may be positioned on the side of, and below, tire 3. Side filler pad 25 sits on the side of tire 3 that is not under repair, and is adapted to fill any gap present in that area. Filler pad 25 also assists in distributing pressure onto the outside of tire 3. Similarly, bottom filler pad 23 may be provided directly below tire 3 and underneath outside heat pad 22. Finally, outside air bag 20 completely envelopes the tire, heat pad and air bag arrangement, and sits within curved side walls 4 and on top of base member 2.

A higher pressure is maintained within inflatable mandrel 28, inside the tire, than within outside air bag 20, outside the tire. This pressure differential is preferably about 10-15 p.s.i., and allows the tire to be placed in its normal road configuration during curing, which further facilitates the production of a distortion-free patch. This pressure differential is maintained by means of an air differential control system connected to control panel 34. Also, both the inside and outside heating pads are equipped with thermostat controls, which maintain the temperature both within and immediately outside the damaged tire section at the same, consistent temperature, preferably about 280°-320° F.

FIG. 1 also illustrates the function of locking arm 6, which is to bridge the gap present between the top edges of curved side walls 4. The locking arm 6, which can also be seen in FIG. 2, includes two hinge members 8a and 8b. Each hinge member 8a and 8b is affixed to a respective top edge of curved side walls 4. Each hinge member includes lock rings 12a and 12b which have apertures 14a and 14b on each of the respective hinge members 8a and 8b. Lock rings 12a are disposed to engage in complementary fashion with lock rings 12b when locking arm 6 is completed pivoted about hinge 9 to a closed position. Once locking arm 6 is closed and lock rings 12a and 12b are engaged with each other, holes 14 and 14b should be aligned so that they may receive lock pin 16 with handle 7. Lock pin 16 will be inserted through aligned holes 14a and 14b in lock ring 12a and 12b to secure locking arm 6 in its closed position. Additionally, lock pin 16 may be rotated via handle 7 to engage a safety mechanism. The safety mechanism includes male threading on lock pin 16 that engages with female threading on the inner walls of lock rings 12a and 12b when handle 7 is rotated. In a preferred embodiment, lock rings 12a and 12b are spring-loaded and can spread apart and communicate in pressurized fashion with adjacent lock rings. This "positive lock" mechanism assists in maintaining the locking arm in its closed position.

With locking arm 6 bridging the gap present between the top edges of two curved side walls 4, an additional gap will be present directly below locking arm 6 and above the beads 3a of tire 3. This gap must be filled to ensure that air bags 20, 26 and inflatable mandrel 28 do not overinflate, and also to insure for a uniform pressure about the tire repair section. Accordingly, mandrel adaptor 30 and bead filler pads 32 are provided.

Mandrel adaptor 30 and bead filler pads 32 are available in different sizes to properly fill the gap present below locking arm 6, according to the size of tire 3 under repair. The mandrel adaptor may be a metal structure, while the filler pads 32 may be rubber, foam or the like. For example, the larger the tire under repair in the unit, the closer the beads 3a will be to locking arm 6. To properly fill the gap, a smaller mandrel adaptor 30 and bead filler pad 32 will be required. It is desirable to have a snug fit under locking arm 6 such that inflatable mandrel 28 maintains a substantially circular shape in cross-section. If mandrel adaptor 30 and bead filler pad are too small or too large, inflatable mandrel 28, when inflated within tire 3, will become oval in shape causing non-uniform pressure to be exerted over the inside of tire 3. Such non-uniform pressure can ultimately create a repair patch with unacceptable distortions.

Figure 2:
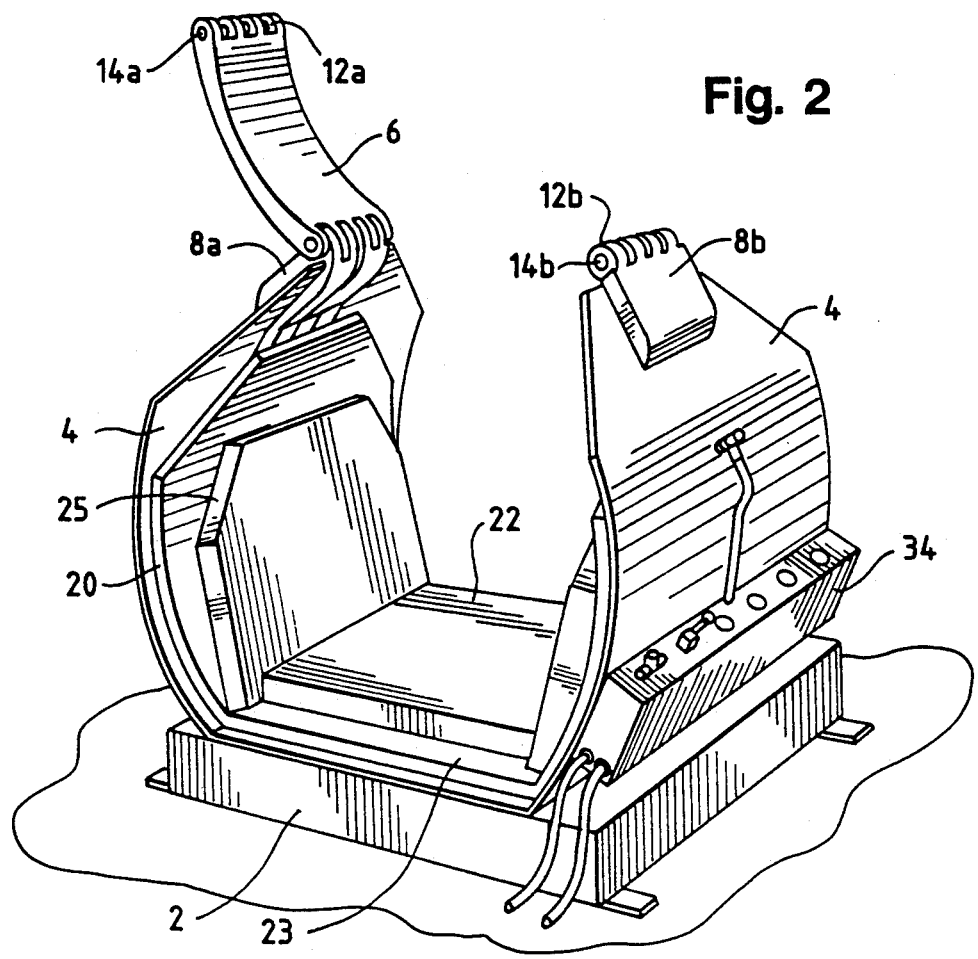
FIG. 2 is a perspective view of the repair unit of FIG. 1 with locking arm open.

As shown in FIG. 2, in the operation of the tire section repair unit of the present invention, the curved side walls 4 are first completely opened to expose their inside surface. Outside air bag 20 is positioned evenly within the cavity of the repair unit 1. Outside heat pad 22 is then positioned in the bottom of the cavity and centered on the damaged spot of tire 3 when it is loaded within the tire 33. Tire 3 is now loaded into repair unit 1. Smaller tires may require the use of a bottom filler pad 23 to fill the space below the tire. If the tire 3 is narrower than approximately 20 inches, side filler 25 should be employed on the side of tire 3 which does not include outside heat pad 22 to ensure a snug fit of tire 3 within the repair unit.

Inside heat pad 24 is now be placed within tire 3 in the area of damage. Inflatable mandrel 28 is then placed within tire 3 inside heat pad 24. If tire 3 is too large for mandrel 28 to adequately fill the void within the tire, inside air bag 26 should be used to fill the space. Once the heat pad and air bag arrangement is in place, the tire section repair unit 1 is closed by positioning locking arm 6 into place over the top of the repair unit as described above.

Figure 3:
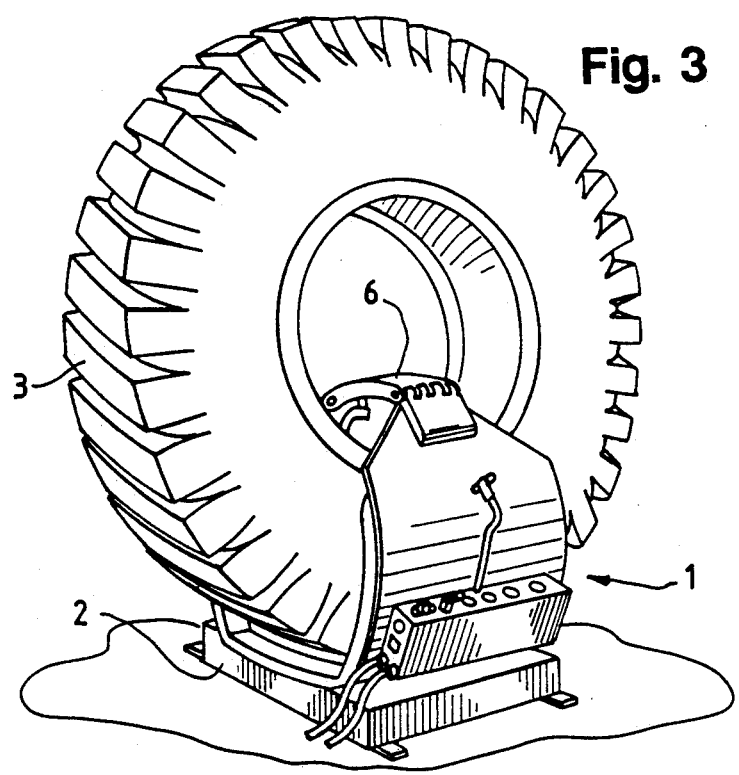
FIG. 3 is a perspective view of the repair unit of FIG. 1 fully loaded with tire in place and locking arm closed.

FIG. 3 shows the fully assembled repair unit with tire to be repaired therein. Side walls 4, after closing and securing of locking arm 6, are brought into close communication with tire 3. Heat pads, air bags, as shown in FIG. 1, ensure a snug fit completely around the sides of the tire. Mandrel 28 exerts pressure from within tire 3. Overall, the repair unit completely surrounds the area of the tire under repair. Once the unit 1 is closed and secure, the inflation and curing process of the rubber patch in the damaged area may begin. After inflation, heating and curing are complete, repair unit 1 may be opened and tire 3 may be removed. Therefore, the employment of the present invention and accompanying process enables a distortion-free rubber patch to the damaged region of tires of varying sizes.

The repair unit of the instant invention may be manufactured in a variety of sizes to accommodate different ranges of tire sizes. Such a wide size range of compatibility provides the invention with greater flexibility of use than disclosed in the prior art. This flexibility is attributed to the novel presence and interplay of pivoting side walls 4 and locking arm 6 of the instant invention.

While the present invention can be successfully used with bias ply tires, it finds particular advantage with radial tires, since it has been found that a non-uniform application of pressure, such as occurs with prior art devices which utilize straps, will cause more distortion of the cured section on radial tires.

It should be understood that various changes and modifications to the preferred embodiments described herein will be apparent to those skilled in the art. Such changes and modifications can be made to the illustrated embodiments without departing from the spirit and scope of the present invention, and without diminishing the attendant advantages. It is, therefore, intended that such changes and modifications be covered by the following claims.

We claim:

1. A lightweight, portable and adjustable tire repair unit for use in vulcanizing a repair patch to a section of a tire, comprising:
    a base member adapted to support a tire to be repaired;
    two substantially rigid and upwardly extending, lightweight side walls pivotally connected to said base member and positioned at a predetermined distance from one another to accommodate a wide range of tire sizes, said side walls being disposed in juxtaposition to a section of the tire under repair;
    inside and outside heating and pressure means contained inside and outside the tire section under repair and within said side walls for applying pressure and heat to the tire section, said heating and pressure means including a flexible, inflatable mandrel positioned within the tire to be repaired; said inside heating and pressure means also including a secondary inner bag for selectively fine-tuning the pressure about the tire; and a substantially rigid locking arm connecting the upper portions of said side walls, whereby said base member, said side walls and said locking arm cooperate to form a substantially rigid and secure structure enclosing the tire section, thus providing an external support to enable the application of uniform pressure to the tire section to be repaired, and ensuring distortion-free curing of the repair patch.

2. The lightweight, portable and adjustable repair unit of claim 1, wherein said locking arm includes a positive lock bar clamp assembly.

3. The lightweight, portable and adjustable repair unit of claim 1, wherein said side walls are curved to facilitate enclosure of the tire to be repaired.

4. The lightweight, portable and adjustable repair unit of claim 1, wherein said heating and pressure means includes heating pads and inflatable air bags.

5. The lightweight, portable and adjustable repair unit of claim 1, further comprising a control panel for selectively maintaining the environment about said damaged tire area and within said side walls, said control panel being positioned on an outside portion of one of said side walls.

6. The lightweight, portable and adjustable repair unit of claim 1, wherein each of said side walls includes lock rings positioned at the respective top ends of said side walls, and said locking arm includes complementary lock rings designed to cooperate with said lock rings on said walls.

7. The lightweight, portable and adjustable repair unit of claim 6, further comprising a lock pin insertable through said cooperating lock rings for preventing disengagement of said lock rings of said walls from said lock rings of said locking arm.

8. The lightweight, portable and adjustable repair unit of claim 7, wherein said lock rings and said lock pin are in threaded communication with each other.

9. The lightweight, portable and adjustable repair unit of claim 8, wherein said lock rings are spring-loaded.

10. The lightweight, portable and adjustable repair unit of claim 1, wherein a portion of said padding means is positioned below said locking arm, thereby allowing a portion of said pressure means positioned with the tire section to be repaired to form a substantially circular cross section.

11. A method for repairing a tire, comprising the steps of:

(a) placing a tire to be repaired within a lightweight and portable tire repair apparatus having a base member and two substantially rigid and upwardly extending, curved side walls pivotally connected to opposite ends of said base member;

(b) surrounding the section of the tire to be repaired within said side walls by inside and outside heating and pressure means so as to provide a snug fit about the tire section under repair, said inside heating and pressure means including a secondary inner air bag;

(c) selectively fine-tuning the pressure about the tire by adjusting the pressure within said secondary inner air bag;

(d) locking said side walls about said heating and pressure means and the tire section under repair by means of a locking arm; and (e) simultaneously heating and applying pressure to the section under repair, thereby enabling uniform temperature and pressure to be applied, and allowing a distortion-free repair.

12. The method of claim 11, further comprising the step of:

controlling the temperature and pressure about said tire section under repair by means of a control panel located on the outer portion of one of said side walls.

13. The method of claim 12, wherein said locking step includes the use of a positive lock bar clamp assembly disposed between and in communication with said side walls.

14. The method of claim 13, wherein said locking step includes the use of lock rings and a lock pin for securing said locking arm in place between said side walls.

15. The method of claim 11, wherein the pressure differential between said inside and outside heating and pressure means is sufficient to allow the tire to be placed in its normal road configuration during vulcanizing.

16. The method of claim 15, wherein said pressure differential is between about 10–15 pounds per square inch.

* * * * *